United States Patent
Todd

(10) Patent No.: US 7,483,876 B2
(45) Date of Patent: Jan. 27, 2009

(54) FLEXIBLE ACCESS OF DATA STORED IN A DATABASE

(75) Inventor: Stephen J. Todd, Winchester (GB)

(73) Assignee: International Business Machines Corporation, Armonk, NY (US)

(*) Notice: Subject to any disclaimer, the term of this patent is extended or adjusted under 35 U.S.C. 154(b) by 658 days.

(21) Appl. No.: 10/389,552

(22) Filed: Mar. 13, 2003

(65) Prior Publication Data

US 2003/0208479 A1  Nov. 6, 2003

(30) Foreign Application Priority Data

May 1, 2002 (GB) ................................ 0209957.0

(51) Int. Cl.
G06F 17/30 (2006.01)
(52) U.S. Cl. ................... 707/3; 707/100; 707/103 R; 707/2
(58) Field of Classification Search ............... 707/2–4, 707/10, 100; 717/127, 131; 719/316
See application file for complete search history.

(56) References Cited

U.S. PATENT DOCUMENTS

| | | | | |
|---|---|---|---|---|
| 5,765,147 A | * | 6/1998 | Mattos et al. | 707/4 |
| 5,862,378 A | * | 1/1999 | Wang et al. | 717/114 |
| 6,061,690 A | * | 5/2000 | Nori et al. | 707/103 R |
| 6,324,683 B1 | * | 11/2001 | Fuh et al. | 717/124 |
| 6,769,124 B1 | * | 7/2004 | Schoening et al. | 719/316 |
| 2001/0023420 A1 | | 9/2001 | Dong et al. | |
| 2003/0037048 A1 | * | 2/2003 | Kabra et al. | 707/4 |

* cited by examiner

Primary Examiner—Cam Y Truong
(74) Attorney, Agent, or Firm—Sawyer Law Group LLP

(57) ABSTRACT

A method and system for processing a request to retrieve data from a database is disclosed. The method of the present invention comprises receiving the request which comprises a function that processes at least one data item specified in the request, retrieving the at least one data item from a database, and invoking the function. When the function is invoked, at least one parameter comprising information related to the at least one data item is passed to the function. Thus, a function can be written independently of the data which they are called to process.

5 Claims, 5 Drawing Sheets

Fig. 2a

| Name (varchar(20)) | Number (char(7)) | Salary (integer) |
|---|---|---|
| Alexandra | 0012345 | 35,000 |
| Sean | 0022346 | 30,000 |
| Rebecca | 0032347 | 30,000 |

<XML><Name>Alexandra</NAME><Number>012345</Number><Salary>35000</Salary></XML>
<XML><Name>Sean</NAME><Number>012346</Number><Salary>30000</Salary></XML>
<XML><Name>Rebecca</NAME><Number>012346</Number><Salary>30000</Salary></XML>

Fig. 2c

<S><Name>Alexandra</NAME><Number>012345</Number><Salary>35000</Salary></S>
<S><Name>Sean</NAME><Number>012346</Number><Salary>30000</Salary></S>
<S><Name>Rebecca</NAME><Number>012346</Number><Salary>30000</Salary></S>

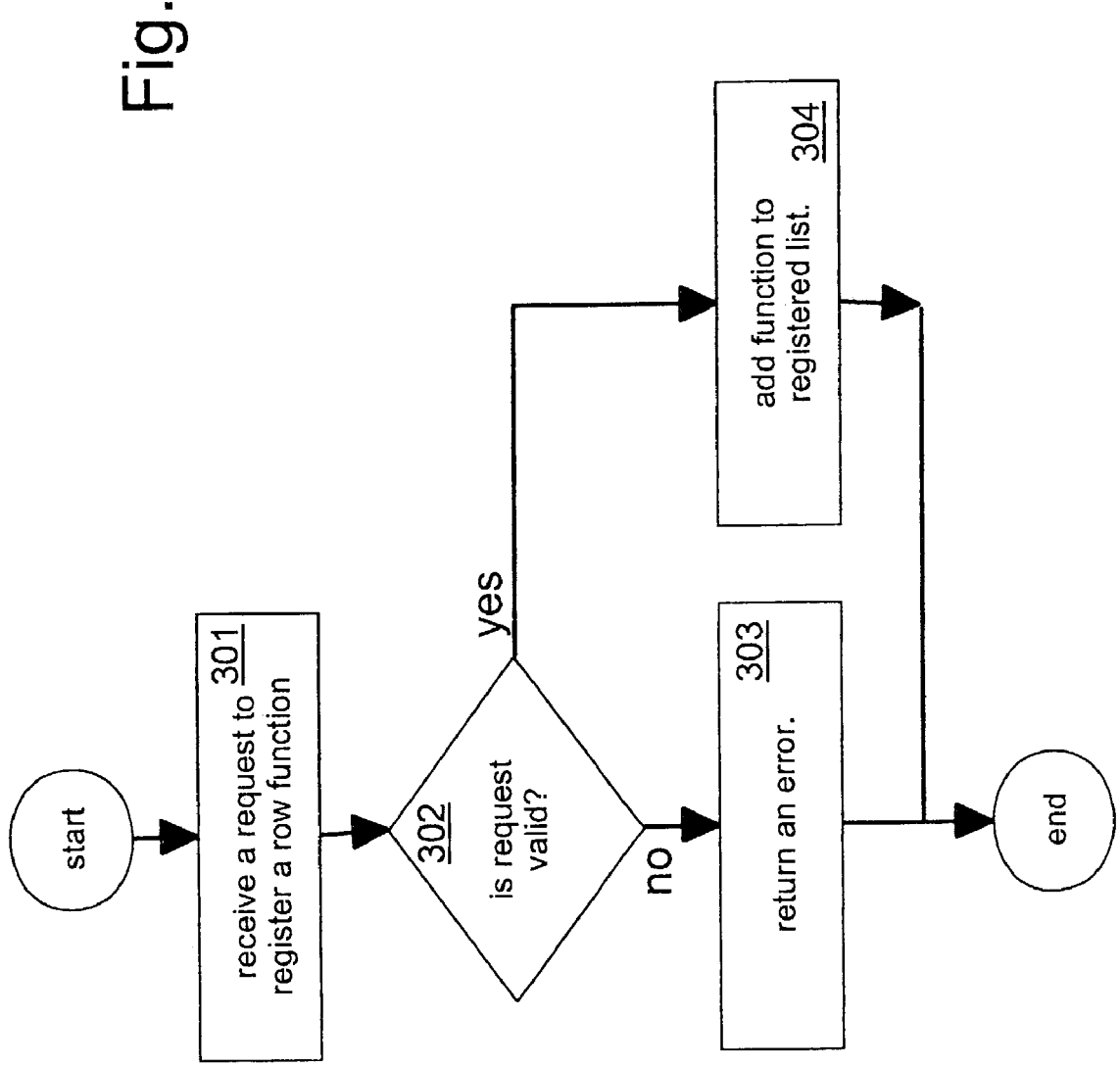

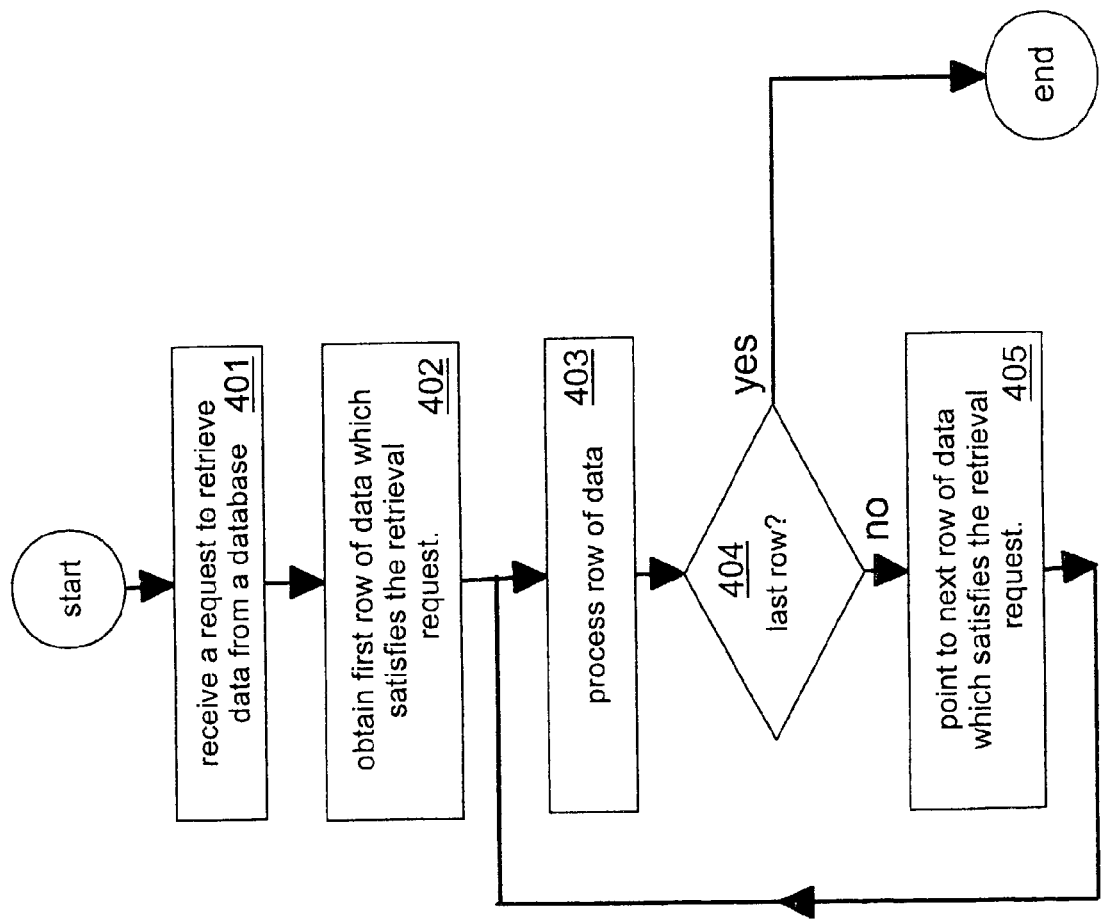

FLEXIBLE ACCESS OF DATA STORED IN A DATABASE

CROSS-REFERENCE TO RELATED APPLICATIONS

This application claims benefit under 35 USC §119 of United Kingdom Application No. 0209957.0, filed on May 1, 2002.

FIELD OF THE INVENTION

The present invention relates to improved flexibility of retrieval of data stored in a relational database.

BACKGROUND OF THE INVENTION

Relational databases are widely used in industry to store, inter alia, commercial data, such as client details and product details. A Relational Database Management System (RDBMS) is software which enables a user to define, construct and manipulate a database using a high level language. Examples of RDBMS's are DB2® of IBM®, Informix® Dynamic Server™, Microsoft® SQL Server and Oracle®.

Structured Query Language (SQL) is a standard high level language, specified by the American National Standards Institute (ANSI), and provides for data definition and manipulation. It is provided by most RDBMS providers, although each provider may provide extensions to the basic standard language. Probably the most widely used SQL statement is the "Select" statement which is used to retrieve data from a database. This is probably best illustrated by a simple example. Consider a table named "EmployeeTable", defined in a database, which contains 3 rows of 3 columns of data items, each row containing data items containing the name, number and salary of each employee. An example of the contents of such a database are:

| Name (varchar(20)) | Number (char(7)) | Salary (integer) |
|---|---|---|
| Alexandra | 0012345 | 35,000 |
| Sean | 0022346 | 30,000 |
| Rebecca | 0032347 | 30,000 |

Note that each column has a defined data type: "Name", defined as Varchar(20), is a variable length null terminated character string of up to 20 characters; "Number", defined as char(7), is a fixed length character string of 7 bytes; and "Salary", defined as integer, is a number.

A "Select" statement can now be used to retrieve data items from this table. For example, the simplest form of the "Select" statement is:

Select * From EmployeeTable;

This is used to obtain a list of all data items in the table. The exact format of the output may vary according to which RDBMS is used but may, for example, be:

| Name | Number | Salary |
|---|---|---|
| Sean | 0022346 | 30,000 |
| Alexandra | 0012345 | 35,000 |
| Rebecca | 0032347 | 30,000 |

While this style of output is not necessarily produced by any RDBMS it will be used for the remainder of this specification by way of example only.

An example of a more selective "Select" statement is:

Select Name, Salary From Employee Table Where Salary>32000;

This would return the name and salary of all employees with a salary of more than 32,000. Note, however, that this statement requires some knowledge of the "EmployeeTable" as the names of the columns "Name" and "Salary" are specified. In this example the output would be:

| Name | Salary |
|---|---|
| Alexandra | 35,000 |

Now, suppose that the salary output is required in US Dollars although the "Salary" column in "EmployeeTable" is entered in sterling. One way of achieving this is for the user to define, to the RDBMS, a function for converting sterling to US dollars which can be used as part of a select statement. Such a function is known as a User Defined Function (UDF) in DB2. This function could, for example, be called "Sterling_to_USDollars", take as input an integer (the data type of "Salary"), and output the resulting calculation as a string containing "$" followed by the converted salary. It would then be possible to specify a "Select" statement using this function:

Select Name, Sterling_to_USDollars(Salary) From EmployeeTable Where Salary>32000;

This statement, assuming an exchange rate of 1.4, would then produce output:

| Name | Salary |
|---|---|
| Alexandra | $49,000 |

Further, suppose the company uses the last four characters of the "Number" column to contain the telephone extension of each employee, and requires an output to contain the telephone extension instead of the employee number. This can also be done using a function defined to the RDBMS which could, for example, be called "Number_to_Phone", take as input a 7 character field, and output the last 4 characters of the "Number" field preceded by an "x". This now enables a select statement of:

Select Name, Number_to_Phone (Number), Sterling_to_USDollars(Salary) From EmployeeTable;

This would produce the output:

| Name | Number | Salary |
|---|---|---|
| Sean | x2346 | $42,000 |
| Alexandra | x2345 | $49,000 |
| Rebecca | x2347 | $42,000 |

Note that it is possible to combine the functionality of "Sterling_to_USDollars" and "Number_to_Phone" into a single function taking two input parameters ("Salary" and "Number").

It can be noted from these examples that a "Select" statement which is more selective than "Select *", requires some knowledge of "EmployeeTable". For example the user must know the column names ("Name", "Number", "Salary") and that data type of "Salary" (for "Where Salary>32000"). Further UDF's require some knowledge of the data type taken as input, for example "Sterling to_USDollars" must be written to accept the "Salary" input as an integer.

In fact any method of producing output which is not a full and unmodified listing of the database as produced from "Select *" requires some knowledge of the database. Whilst such knowledge can be removed from the select statement by writing a UDF function that takes an entire row as input, the UDF must be written with a parameter list that defines the correct column data types in the correct order. This is clearly restrictive on the user, making it impossible to write a UDF that is not hard coded to accept a specific data type or specific data types in a specific order.

Therefore, there is a need for a more flexible method and system for retrieving data using a UDF. The present invention provides such a method and system.

SUMMARY OF THE INVENTION

The present invention provides method and system for processing a request to retrieve data from a database. The method of the present invention comprises receiving the request which comprises a function that processes at least one data item specified in the request, retrieving the at least one data item from a database, and invoking the function. When the function is invoked, at least one parameter comprising information related to the at least one data item is passed to the function.

According to the method and system of the present invention, a database engine can enable a user defined function to be used when retrieving data items from a database, whereby the user defined function does not require specific knowledge of the type(s) of the data items on which it is to operate. Thus, a function can be written independently of the data which it is called to process.

According to a first aspect, the at least one data item has an associated value and type and the at least one parameter comprises the value and an indication of the type of the at least one retrieved data item. Preferably the information passed to the function, in the at least one parameter, also comprises the names of each of any data items it is passed. The name of a data item will normally be the name associated with a column in a table from which the data item was retrieved. As a result, if the function needs to be aware of the name associated with the data items on which it operates, it can obtain this information from the information it is passed.

A further advantage can be achieved by enabling one or more variables to be passed to the function. Preferably a name and value for one or more variables can be included in the request, for passing to the function. These variables are then passed, in the information passed to the function, in the same way as a data item retrieved from the database and assuming a default type. For example, assuming a default type of null terminated string, the specification of a variable in the format "$ as Currency" would result in the information passed to the function including an item with the name "Currency", a value of "$", and a type of null terminated string. Optionally specification of a variable can include a type to be used instead of the default type.

Where a data retrieval request requests data items from a table which comprises a plurality of rows, each row comprising a plurality of data items, an RDBMS could implement the present invention by passing information pertaining to all data items from the plurality of rows in a single invocation of the function. However, this would only be useful for a simple retrieval request involving, for example, no other functions or conditions. As a result it is preferable to call the function once for the data items contained in each row of data that is retrieved from the table, according to the retrieval request.

It can be useful for a function to enclose any output it produces as a result of processing all of data items specified for retrieval by the request with, for example, a leading string and a trailing string. This is problematic if the function is called more than once as part of processing the request and as a result it is preferable that the function is called in a way that enables it to do this. One method of achieving this is to initially invoke the function before passing it any data items, with an indication that it is the first invocation (and in the next invocation it will be passed one or more data items) and to finally invoke the function, after all data items have been passed, with an indication that this is the last call (and no more data items will be passed). The initial and final calls do not pass any data items, but may pass variables. Alternatively, assuming that the function is invoked more than once to process data items, the first and last call indications can be included in the first and last calls, respectively, to the function which pass data items. Further note that the requests to retrieve data can specify that the data items are to be passed to the row function in one or more groups based on one or more data items. In this case the row function can be called to indicate the first and last calls to the row function for each group of data items and the row function may therefore be called more than once with last and first call indications in the processing of a single request.

Preferably the request can also include a value which indicates that all data items from each row of a table are to be retrieved, for example "*" as in "Select *". Preferably this can be done when the request further includes one or more variables to be passed to the function. All data items from each row are then passed to the function on each invocation in addition to any variables. This is advantageous because it enables a function to be written which can be used for different tables and modify its behaviour based on the value of the variable passed to it.

Preferably an RDBMS allows the function to be pre-registered so that when it is specified in a retrieval request the RDBMS can easily check the request for valid use of the function. Alternatively, for example, the RDBMS can locate the function based on a search path.

Preferably the output accepted by the RDBMS, from the function called, is a character string. This may be, for example, a return value from the function or an output parameter further included in the parameter list. This enables a row function to be used in the same way in retrieval requests as, for example, prior art user defined functions as supported by DB2.

BRIEF DESCRIPTION OF THE DRAWINGS

The invention will now be described, by way of example only, with reference to a preferred embodiment thereof, as illustrated in the accompanying drawings, in which:

FIG. 2a is an example of the contents of a simple table defined in a database;

FIG. 2b is an example of the type of output that may be required from a user defined function;

FIG. 2c is an example of the type of output that may be required from a user defined function;

FIG. 3 is a flow diagram of receiving a request to register a row function;

FIG. 4 is a flow diagram of processing a request to retrieve data items from a database.

DETAILED DESCRIPTION

Figure 1:
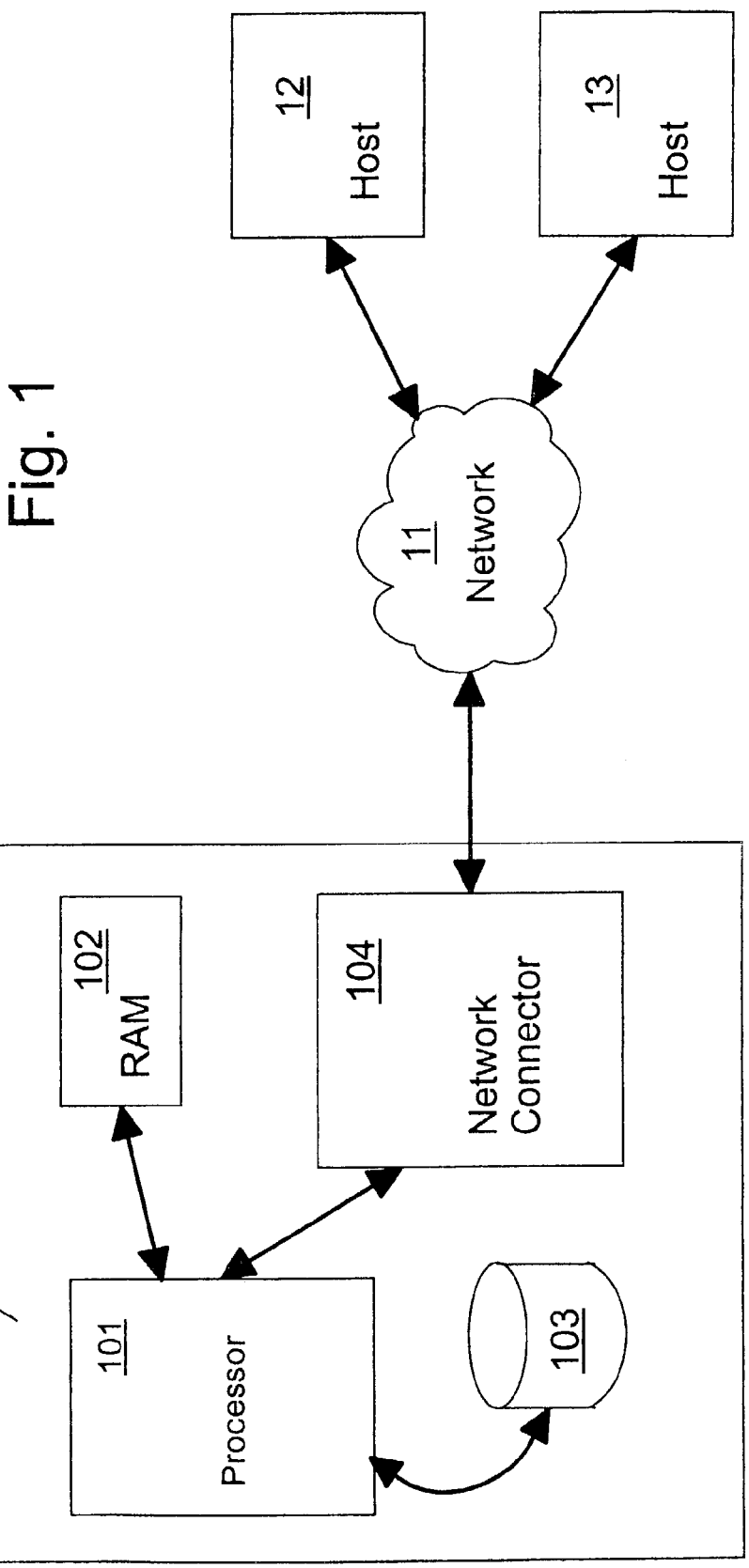
FIG. 1 is a block diagram of a data processing environment in which the preferred embodiment of the present invention can be advantageously applied.

FIG. 1 is a block diagram of a data processing environment in which the preferred embodiment of the present invention can be advantageously applied. In FIG. 1, a client/server data processing host 10 is connected to other client/server data processing hosts 12 and 13 via a network 11, which could be, for example, the Internet. An RDBMS, such as DB2, may be installed on any such client/server and accept requests to retrieve data from any client/servers, including the one on which the RDBMS is installed. Client/server 10 has a processor 101 for executing programs that control the operation of the client/server 10, a RAM volatile memory element 102, a non-volatile memory 103, and a network connector 104 for use in interfacing with the network 111 for communication with the other client/servers 12 and 13.

The preferred embodiment will be described with reference to DB2 and SQL although the present invention equally applies to other RDBMS's including those that use an alternative to SQL. DB2 provides support for User Defined Functions (UDFs) which are generally written by users although they can also be provided by the RDBMS provider or even a 3rd party. A UDF is used in performing operations within an SQL statement and is useful for such things as transforming data values, performing calculations on one or more data values and extracting parts of a value. A UDF can be written in a high level language, for example C, C++ or Java, although C will be used in the preferred embodiment. Once written, a UDF is defined to DB2 and then, when used, is effectively run as part of the DB2 engine. This provides a performance advantage and enables simplification of the processing of SQL requests by users and applications. Whilst the preferred embodiment is discussed in terms of a UDF, other RDBMS's may use a different term to refer to an equivalent feature.

The present invention is best illustrated by example and is best first viewed from the perspective of the user. Consider the database table previously discussed and as illustrated in FIG. 2a. This figure shows the employee table which has been populated with three rows of data, each row being for a different employee, namely Alexandra, Sean and Rebecca. Each row of data comprises three columns which contain the name, employee number and salary for each employee. Note that the headings (201) shown in FIG. 2a are not a row of data in the table but will have been defined when the table was created and are included in this figure for illustration purposes. These show that the "Name" column is defined as a variable length character string of up to 20 bytes, the "Number" column is defined as a fixed length character string of 7 bytes and the "Salary" column is defined as an integer.

Assume, from this table, that the user requires to output an XML string for each employee, as illustrated in FIG. 2a. This can be achieved using a user defined function (UDF). Consider first a prior art UDF named "Employee_to_XML" and which is used in the following "Select" Statement:

SELECT Employee_to_XML(*) FROM EmployeeTable;

A UDF is called once for each row of data and so "Employee to_XML" must accept, as input, data items of the required type for each row. For example, in C, the function prototype could be:

```
void SQL_API_FN Employee_to_XML
(
    char   *name,           /* input parameter value of name    */
    char   *number,         /* input parameter value of number  */
    int    *salary,         /* input parameter value of salary  */
    char   *out_XML_String  /* output field containing XML string */
);
```

Based on this prototype and assuming that the function has knowledge of the column names (i.e., "Name", "Number" and "Salary") it would be obvious to a person skilled in the art how to code the required UDF to write the output shown in FIG. 2b into "out_XML_String".

However, if it was required to write the prior art UDF without knowledge of the column names these could be passed as parameters into the UDF. In this case the column names would need to be passed into the routine and this would require a modification of the "select" statement, for example:

SELECT Employee_to XML("Name", Name, "Number", Number, "Salary", Salary) FROM EmployeeTable;

And based on this "Select" statement the C function prototype of the UDF would be:

```
void SQL_API_FN Employee_to_XML
(
    char    *nameColString,
    char    *name,
    char    *numberColString,
    char *number,
    char    *salaryColString,
    int     *salary,
    char *out_XML_String
);
```

Once again, from this prototype it would be obvious to a person skilled in the art how to code the required UDF to write the output shown in FIG. 2b into "out_XML_String".

Now consider the definition of a UDF which can be used with an RDBMS that exploits the present invention. According to the present invention the RDBMS must be able to pass to the UDF details of data items from a table in a manner that requires no prior knowledge of their types. According to the preferred embodiment this is achieved by the RDBMS defining a C structure:

```
struct SQLUDF_ROWDATA
{
    int    *type,  /* pointer to indicator of column data type */
    void   *value, /* pointer to value of column value         */
    char   *name   /* pointer to string containing column name */
};
```

This structure contains information pertaining to a single data item, and as a result, details of a number of data items can be passed to a UDF in an array of these structures. Such an array will contain one element (structure) for each data item passed to the routine from a given row. Each element contains 3 members: "type" is an indicator of the data type, for example "1" could indicate Integer and "2" could indicate a null terminated character string; "value" is the value of the data and must be interpreted according to "type"; and "name" contains the column name as defined when the table was created and is a null terminated character string. The order of the data items in the array will be the same as specified in the "select" request or, if "*" (meaning all columns) was specified, the same as defined in the table. As a result a UDF can be defined by the C function prototype:

```
void SQL_API_FN to_XML
(
    int              numdata,            /* number of elements in array */
    SQLUDF_ROWDATA[] *rowdata,            /* array of data items */
    char             *output_XML_String  /* output field for XML string */   );
```

The UDF is therefore passed an array of "SQLUDF_ROW-DATA" structures which is addressed by variable "rowdata". From this it would be obvious to a person skilled in the art how to write the code to load the required output into the output variable "out_XML_String".

Thus, according to the present invention it is possible to define an new type of UDF which takes, according to the preferred embodiment, an array of SQLUDF_ROWDATA structures as input. Note, for the remainder of this specification this new type of UDF will be referred to as a "row function" in order to distinguish from the prior art UDF. Further because a row function, according to the preferred embodiment, produces the same output (a single character string as specified in "output_XML_String") as a prior art UDF it can be used in any select statement where a prior art UDF can be used. However, in other embodiments the output of a row function could be different.

A row function is extremely versatile because, unlike a prior art UDF, it is not restricted to being passed a specific number of data items, and specific data types in a specific order. For example consider the following "Select" statements:

1. SELECT to_XML(*) FROM EmployeeTable;
2. SELECT to_XML(Name,Number) FROM EmployeeTable WHERE Salary>30000;
3. SELECT to_XML(Number,Salary) FROM EmployeeTable;
4. SELECT to_XML(Salary,Number) FROM EmployeeTable;
5. SELECT to_XML(Name,Salary,Number) FROM EmployeeTable;

For each of these statements, according to the prior art, a different UDF would be required because no two uses of the "to_XML" UDF have parameters of the same type in the same order. However, according to the preferred embodiment of the present invention a single row function could be written for use in each of these statements. Thus row functions are particularly useful for, but not limited to, functionality such as that used in the above example in which the row function is not required to carry out processing according to the actual value of a data item, but rather always processes a data item the same irrespective of its value. Further, in this respect, a row function can be used for different tables, for example "to_XML" as a row function would not carry out any processing particular to "EmployeeTable" and so could also be used for other tables.

Further, according to the present invention, the parameter list for a row function specified in a select statement may include parameters, for example a specific value, in conjunction with an "*". This enables a row function to be written which is capable, for example, of either providing the output as shown in either FIG. 2b, which uses "XML" as the XML tag, or FIG. 2c, which uses "S" as the XML tag, and which is not limited to use with "EmployeeTable". For example, if the "to_XML" row function assumes the XML tag is "XML" unless it receives an input parameter, named "XMLTag", containing a string to use as the XML tag, it could be used in the following "select" statements:

1. SELECT to_XML(*) FROM EmployeeTable;

2. SELECT to_XML("S" as $XMLTag, *) FROM Employee Table;

It is then obvious to a person skilled in the art how to write a single "to_XML" row function such that the first invocation produces the output shown in FIG. 2b and the second invocation produces the output shown in FIG. 2c.

Preferably a database engine which supports row functions also includes execution time support for specification of parameters for a row function which includes use of a "*" with specific values. However, if this is not the case, or for performance reasons, a prepare phase may be provided which expands the "*" into a full list of table columns for an execution phase. For example consider the following statement:

SELECT to_XML("S" as $XMLTag, *) FROM Employee Table;

The prepare phase would convert the statement, for the table "EmpoyeeTable" shown in FIG. 2a, to:

SELECT to_XML("S" as $XMLTag, Name, Number, Salary) FROM EmployeeTable;

Note that, according to the preferred embodiment of the present invention, specific values (or variables) are passed to a row function in the same way as data items, that is as "name, value, type" triples. Such specific values are specified in the "select" statement as:

<value> as $<name>[is <type>]

For example: "5 as count is Integer" specifies an integer variable named count with a value of 5.

Note that "[is <type>]" is shown in [ ] as it is optional and, in the event it is omitted, a default type is assumed. In the preferred embodiment the default type is VARCHAR (null terminated string). "Name, value, type" triples can then be specified to a row function, for example, in a select statement:

SELECT to_XML("S" as $XMLTag,*);

Thus the first element in the SQLUDF_ROWDATA structure will contain a null terminated string (the default) named "$XMLTag" with a value of "S". Note that one or more such variables can be passed to a row function and at any position in the input list. These are then passed to the row function, with the data items, in the order specified.

A person skilled in the art would realize that, alternatively, a variable could be passed to the row function by adding it to the function prototype and passing it as an individual parameter rather than in the SQLUDF_ROWDATA structure.

Optionally, according to the present invention, the preferred embodiment can further include support for row functions which require, for a given request, to know the first, last, and optionally intermediate times it is called to process the given request. For example consider a, row function that is required to produce the output shown in FIG. 2b, but preceded with a line comprising the string "<ALL>" and followed with a line comprising the string </ALL>. This is achieved in the preferred embodiment by defining the row function with a C prototype of:

```
void SQL_API_FN to_XMLGroup
(
    char        *calltype,   /* type of the call         */
    int         numdata,     /* number of elements in array */
    SQLUDF_ROWDATA[] *rowdata,          /* array of data items */
    char        *output_XML_String /* output field for XML string */  );
```

This prototype further includes the "calltype" parameter which is set by the database engine to values which indicate the first, intermediate and last calls to the function which are part of processing a request. Now consider a request to call this function:

SELECT to_XMLGroup("ALL" as $Group, *) FROM EmployeeTable;

The database engine will process this request by first calling "to_XMLGroup" with "calltype" set to indicate the first call to the row function and an SQLUDF_ROWDATA structure containing the value of the "Group" variable and no data items. Following this "to_XMLGroup" will be called, once for each row of suitable data, with "calltype" set to indicate an intermediate call and an SQLUDF_ROWDATA structure containing the value of the "group" variable and data items from a single row of the table. Finally, after all rows have been processed, "to_XMLGroup" it is called a final time with "calltype" set to indicate the last call to the row function and an SQLUDF_ROWDATA structure containing the value of the "Group" variable.

Given this calling sequence it would be obvious to a person skilled in the art how to write the "to_XMLGroup" function to produce the required output. Note that the function could produce an output string for each call, or could save output from some calls and return concatenated strings in later calls. For example "to_XMLGroup" could return null strings to all calls apart from the last from which it returns the entire output string. Further note that some requests to retrieve data can request that the data items are passed to the row function in groups based on one or more data items. In this case the row function can be called to indicate the first and last calls to the row function for each group of data items and the row function may therefore be called more than once with last and first call indications in the processing of a single request.

A person skilled in the art would realize that there are many ways of passing "calltype" to the row function. For example in another embodiment, it could be added to the SQLUDF_ROWDATA structure. Further if the request results in the row function being called for more than one row of data, "calltype" can be set to indicate the "first" call when passing the row function the first row of data and to indicate "last" call when passing the last row of data. If the request results in the function being called for only one row of data, "calltype" can be set to indicate that the function will be called only once.

A person skilled in the art would realize that there are many different ways of defining the SQLUDF_ROWDATA structure. The members could be in a different order or of a different type. For example any field could be defined as any type of pointer or any type of fixed length field, although some choices offer better solutions than others. Further a length member can be included to indicate the length of the data in the "value" member and one or more members can be included in one or more sub structures within the SQLUDF_ROWDATA structure.

A person skilled in the art would also realize that alternative methods could be used for indicating the number of elements passed to the "to_XML" function. In the above example the "numdata" variable was specified in the C function prototype. One alternative, for example, could be including a extra element at the end of the array which can be recognized in code as a null element. Another alternative, for example, could be adding another member to the "SQLUDF_ROWDATA" structure which can be used to mark the last element of the array.

Further, a person skilled in the art would realize that languages such as C provide support for variable-argument functions which are functions that accept a varying number of arguments. As a result, rather than passing a row function an array of "SQLUDF_ROWDATA" structures it would be possible, for example, to pass a varying number of "SQLUDF_ROWDATA" structures or even a varying number of individual parameters which, in aggregate, contain the equivalent information as "SQLUDF_ROWDATA" structure for each data item requested.

Note that the inclusion of the "name" member in the "SQLUDF_ROWDATA" structure is optional because a row function can be written for a particular table and be hard coded with the names of the columns. However, the advantage of including the column name in the data passed to the row function is that it is possible to write a general purpose row function which can be used with many different tables, for example a row function that creates XML strings based on any table.

The preferred method, according to the present invention, of an RDBMS handling a row function will now be discussed with reference to FIGS. 3, 4 and 5. Note that this method does not include indicating to a row function the first and last calls to it.

FIG. 3 shows the processing of the RDBMS when processing a user request to register a row function with the RDBMS. At step 301 a request is received to register a row function. At step 302 a check is made to see if the register request is valid. According to the preferred embodiment a registration request may be invalid because the request contains errors or the function does not adhere to requirements, such as accepting the correct inputs which are an SQLUDF_ROWDATA structure, an integer to contain the number of data columns contained in the structure, and a single output parameter. If the request is invalid an error message is output at step 303, but if it is valid at step 304 the details of the row function are saved for look up when the function is later required in the processing of a select request.

Note that in DB2 a UDF is registered using a "CREATE FUNCTION" statement. In the preferred implementation a "ROW" option is added to those available with the "CREATE FUNCTION" statement to designate a row function. In another embodiment a new statement may be created for this purpose, such as "CREATE ROWFUNCTION" In another embodiment the RDBMS may look in the parameter list of the function defined to see if it contains the "SQLUDF_ROW-DATA" structure or the equivalent to this structure used in the particular embodiment. It may also be possible to omit the registration procedure altogether if the RDBMS recognises when a row function is used based on it being specified on a "select" statement and has some means of finding it when required such as a defined search path.

FIG. 4 shows the processing of the RDBMS when processing a request to retrieve data, such as an SQL "Select" statement. At step 401 a request to retrieve data from the database is received. At step 402 the first row of data that requires processing by the request is obtained. At step 403 the row obtained is processed. This step will be described more fully below with reference to FIG. 5. At step 404 a check is made to see if the last row has been processed, if so the method is stopped, but if not the next row of suitable data is obtained at step 405 and processing loops back to step 403.

Figure 5:
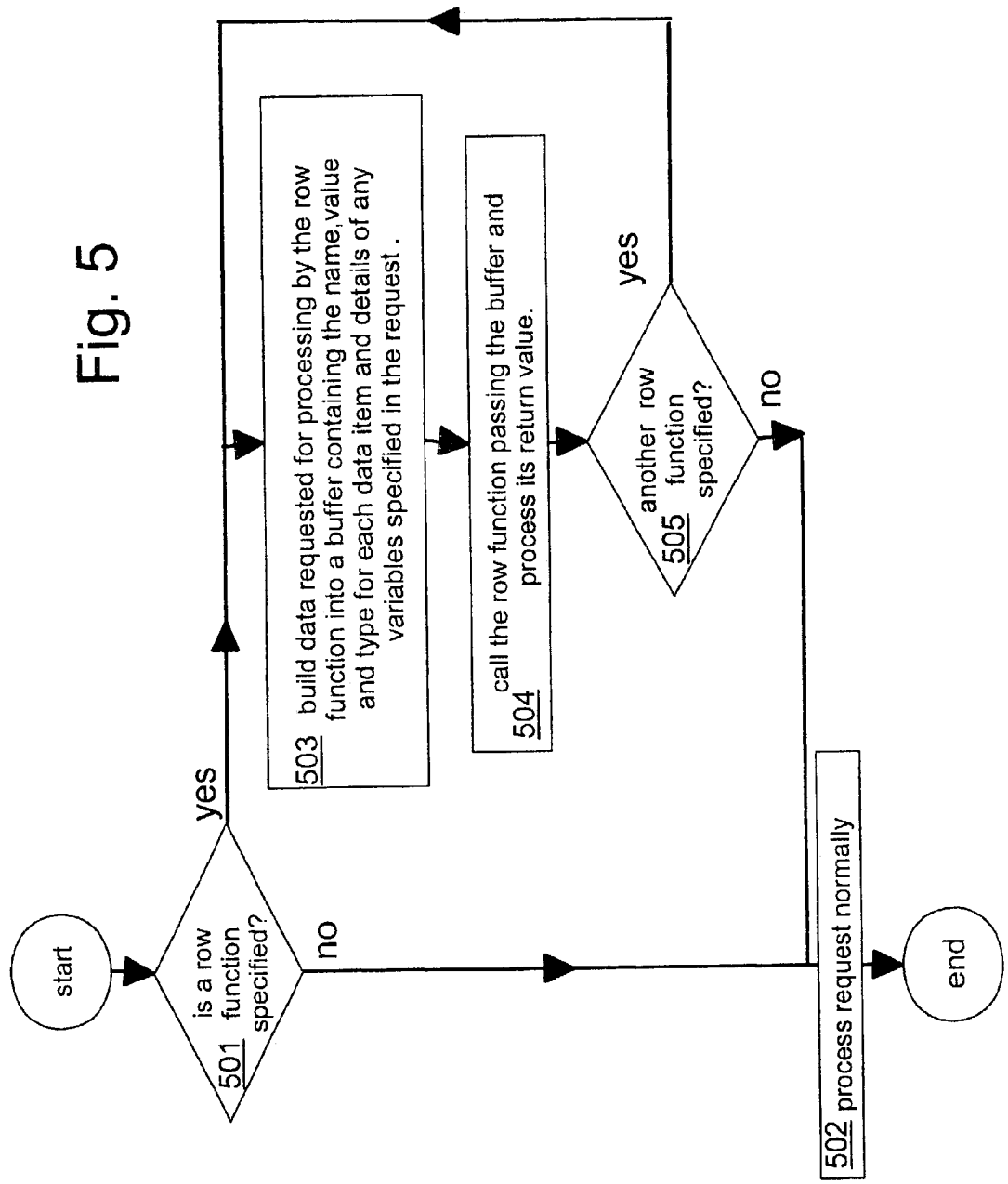
FIG. 5 is a flow diagram of calling a row function during the processing of a request to retrieve data items from a database.

FIG. 5 shows the processing for each row of data which must be processed as a result of the request. In this process the RDBMS must be sensitive to the inclusion of a row function in the request as it must build the required data into the "SQLUDF_ROWDATA", or equivalent, structure. At step 501 a check is made to see if the request includes use of a row function. In the preferred embodiment this requires looking up the specified row function in the details of registered row functions saved at step 304 of FIG. 3. If a row function is not specified the request is processed normally, according to the prior art, at step 502. However, if use of a row function is specified processing proceeds to step 503. At this step the RDBMS builds the data required for processing by the row function into a buffer. In the preferred embodiment the buffer is defined by an array of "SQLUDF_ROWDATA" structures which contain the column name, value, and type for each data item requested and details of any variables specified, in the request, for passing to the function. Other embodiments may use a different format of buffer and not include the column name.

At this step in the preferred embodiment, the RDBMS also tracks the number of data items contained in the buffer as this is also passed to the row function. At step 504 the row function is called passing the contents of the buffer and the number of data items that it contains. Any output produced by the row function is then processed by the RDBMS according to the data retrieval request received at step 401 in FIG. 4. As the request may include use of more than one row function, at step 505 a check is made to see if this is the case. If another row function is specified processing returns to step 503. Steps 503, 504, and 505 are then repeated until all row functions specified in the request have been processed. When all row functions have been processed, processing continues to step 502 where continued processing of the request according to the prior art are carried out.

Note that for convenience, FIG. 5 shows the row function (s) specified in a request being processed first followed by any normal processing. In practice, processing of a data retrieval request will not follow such a rigid pattern and will depend largely on the syntax of the retrieval request. As a result, the order of processing row functions followed by normal processing is not essential to the present invention.

Further note that the exact sequence of the steps from the methods described in FIGS. 3, and 4 may vary in other embodiments without departing from the present invention. For example in FIG. 4, the database calls the row function for individual rows of data. However, it would be quite possible to use the present invention in an RDBMS that provides data from multiple rows to a row function in a single invocation.

Thus the present invention provides a new method for enabling the flexible retrieval of data from a relational database. This is based on functions which are generally defined by users and specified in data retrieval requests to carry out some processing of the data retrieved. According to the present invention these functions are passed information containing details of the value, type, and optionally name, for each of the data items it is to process. Thus an RDBMS enables the provision of functions which can be written independently of the data which they are called to process.

What is claimed is:

1. A method for processing requests to access a database, the method comprising:

receiving a request to access the database;

processing the request to register a function by determining whether the request is valid or not valid, the request identifying the function, if the request is valid, the function is saved for lookup, specifying at least one data item in the database to be processed by the function, the function having no prior knowledge of a data type of the at least one data item, a name of the at least one data item, and a value of the at least one data item;

wherein the function is independent of the at least one data item, defining a first instance of a defined data structure for the at least one data item, the first instance of the defined data structure comprising:

a pointer to the data type of the at least one data item, a pointer to the name of the at least one data item, and a pointer to the value of the at least one data item;

passing details of the first instance of the defined data structure to the function in a manner that requires no prior knowledge of data type to provide the function details of the data type of the at least one data item, the name of the at least one data item, and the value of the at least one data item;

wherein the request to access the database further specifies a variable to be processed by the function, the function having no prior knowledge of a name of the variable, a value of the variable, and a data type of the variable, wherein the method further comprises:

defining a second instance of the defined data structure for the variable, the second instance of the defined data structure comprising a pointer to the name of the variable, a pointer to the value of the variable, and a pointer to the data type of the variable; and passing details of the second instance of the defined data structure to the function in a manner that requires no prior knowledge of data type to provide the function details of the name of the variable, the value of the variable, and the data type of the variable; and processing the variable using the function;

and outputting a result from processing of the variable;

retrieving the at least one data item in the database using the function, the first instant of the data structure and the outputted result from the processing of the variable;

and outputting a result from said retrieving the at least one data item in the database.

2. The method of claim 1, wherein the first instance of the defined data structure further comprises a pointer to a calltype to the function, the calltype to the function indicating whether a call to the function is a first call, an intermediate call, a last call, or a single call to the function, and wherein passing the first instance of the defined data structure to the function further provides the function of the calltype.

3. The method of claim 1, wherein the first instance of the defined data structure further comprises a mark denoting whether the first instance is a last instance of the defined data structure to be passed to the function, and wherein passing the first instance of the defined data structure to the function further provides the function details of whether first instance is the last instance of the defined data structure to be passed to the function.

4. The method of claim 1, wherein the function is not restricted to being passed a specific number of data items with specific data types in a specific order.

5. The method of claim 1, wherein the function is a user-defined function.

* * * * *